United States Patent Office 3,448,125
Patented June 3, 1969

3,448,125
METHOD OF EPOXIDATION USING PHOSPHORIC ACID CATALYST
Ellington M. Beavers, Meadowbrook, and Joseph E. Koroly, Drexel Hill, Pa., assignors to Rohm & Haas Company, Philadelphia, Pa., a corporation of Delaware
No Drawing. Continuation-in-part of application Ser. No. 409,272, Feb. 9, 1954. This application Sept. 28, 1965, Ser. No. 491,043
Int. Cl. C07d 1/06, 1/08, 1/02
U.S. Cl. 260—348.5  8 Claims

ABSTRACT OF THE DISCLOSURE

A process for preparing an epoxidized ester of water-insoluble, unsaturated, unsubstituted aliphatic acids is provided. The process comprises reacting these esters with an aqueous mixture of hydrogen peroxide, formic acid, and phosphoric acid having a pH of 0.0 to −1.5.

---

This invention relates to an improved process of epoxidizing esters of unsaturated fatty acids whereby epoxy groups

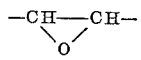

are added to the acid portion of the esters at those points originally occupied by double bonds. More particularly, it relates to a process of epoxidizing esters, especially glyceryl esters of fatty acids, especially of oleic, linoleic, and linolenic acids.

This application is a continuation-in-part of our copending application U.S. Ser. No. 409,272 filed Feb. 9, 1954, and now abandoned.

Epoxidation of such esters by means of performic acid or peracetic acid has been described heretofore, for example, in U.S. Patents 2,458,484, 2,485,160, 2,567,930, and 2,569,502 and in journal articles including an article by Greenspan and Gall (Industrial and Engineering Chemistry, vol. 45, No. 12, pp. 2722–2726 (December 1953)).

The main object of this invention is to provide a process of epoxidizing esters of unsaturated acids which can be used on a large industrial scale and which is faster, more economical, more efficient and safer than any process known heretofore. Another object is to provide a process which yields esters—particularly the fatty acid esters of glycerol—which have high contents of oxirane-oxygen and low iodine numbers and which also have a minimum of hydroxy and formoxy substituents.

Epoxidized esters, such as are prepared by the process of this invention, are widely used as stabilizers and plasticizers for a variety of organic plastic materials, such as polyvinyl chloride, copolymers of vinyl chloride and vinyl acetate, and chlorinated rubber.

The process of this invention comprises reacting an ester of an unsaturated fatty acid with an aqueous mixture of hydrogen peroxide, formic acid and another acidic agent in addition to the formic acid, which mixture has a pH value of 0.0 to −1.5. The reaction can be carried out at temperatures from about 10° C. to the boiling point of the aqueous mixture, but in commercial production it is much preferred to operate from about 50° C. to about 80° C.

Performic acid is always present in the aqueous mixture in equilibrium with the formic acid and hydrogen peroxide, and it is believed that it is this performic acid which enters the organic ester phase and is responsible for the epoxidation of the double bonds in the acid moiety of the ester. During the epoxidation reaction the performic acid is reconverted to formic acid which then again reacts with the hydrogen peroxide to form more performic acid which further epoxidizes the ester. This process continues until the hydrogen peroxide is consumed or until epoxidation is essentially complete. The maximum amount of formic acid which is used is one mole for each double bond in each mole of esterified acid. That is to say, the maximum amount of formic acid which is employed is one mole for each mole of unsaturation in the fatty acid ester. According to the best practice, however, it is much preferred to employ less than one mole of formic acid for each mole of unsaturation. Amounts of formic acid as low as 0.02 mole per mole of unsaturation have been employed successfully. When such considerations as economy and efficiency of epoxidation are taken in account, it is much preferred that the quantity of formic acid, which is employed, be from 0.05 to 0.5 mole per mole of unsaturation.

The amount of hydrogen peroxide which is employed should be at least one mole for each double bond in each mole of esterified acid. This minimum amount of hydrogen peroxide is required because the peroxide is the ultimate source of the oxygen atom which forms the three-membered epoxide group or oxirane ring with the two carbon atoms joined by the original double bond. Thus, for example, in the epoxidation of an oleic acid ester of a monohydric alcohol one mole of hydrogen peroxide is required for complete epoxidation since there is one double bond in the ester or, expressed another way, since there is one mole of unsaturation. Furthermore, two moles of hydrogen peroxide are required to epoxidize completely one mole of a linoleic ester of a monohydric alcohol because linoleic acid contains two double bonds. The same minimum amount, two moles, is needed to epoxidize one mole of an oleic ester of a dihydric alcohol. Ordinarily, an excess of hydrogen peroxide is employed. Such an excess facilitates the course of reaction. An excess of about 0.1 mole over the minimum of one mole, which is required by theory, is usually adequate but the excess may be as much as a full mole, thus making the recommended ratio of peroxide from one to two moles per mole of unsaturation. Commercial grades of hydrogen peroxide, containing as much as 90% peroxide, are suitable.

The aqueous mixtures of hydrogen peroxide and formic acid which are employed have a pH of 0.0 to −1.5 by virtue of containing, in addition to the formic acid, an auxiliary, water-soluble acidic agent. The following are typical acidic materials which have been used successfully and advantageously: inorganic acids such as phosphoric, hydrochloric, nitric, and boric acids; acid-forming salts such as sodium acid sulfate, potassium acid sulfate, potassium persulfate and zinc chloride; organic sulfonic acids such as toluene sulfonic and methane sulfonic acids; strong carboxylic acids such as maleic, fumaric and oxalic acids; and acidic esters such as ethyl di-acid phosphate, n-propyl di-acid phosphate, mono- and di-methyl sulfate.

While formic acid alone can be used in such high ratios as to provide a pH of 0.0 to −1.5 to the aqueous peroxide mixture, it is undesirable to use formic acid as the sole source of the low pH because such a process is less safe and less efficient and because the resultant ester contains hydroxy and formoxy substituents rather than epoxy groups. Accordingly, an auxiliary acidic material is always used in conjunction with the formic acid and the latter is used in the lowest amount which is commensurate with a fast rate of epoxidation.

The auxiliary acidic agent must be soluble in the aqueous mixture of hydrogen peroxide and formic acid. It is also preferred that it have little, if any, solubility in the organic ester phase, i.e., in the ester being epoxidized. Thus, the inorganic acidic agents are recommended over the organic acidic materials. This is because organic acidic agents, such as maleic acid or oxalic acid, which are more soluble than inorganic compounds in the organic phase tend to react with the epoxy compounds and to convert them to hydroxy and/or acyloxy derivatives, which according to this invention are to be avoided as far as possible. Currently, phosphoric acid is much preferred over all of the wide variety of acidic agents which have been employed.

It has been discovered that the epoxidation reaction proceeds much more smoothly and more rapidly when the aqueous mixture contains the three components, hydrogen peroxide, formic acid and auxiliary acidic material, and has a pH value within the range of 0.0 to $-1.5$ than when the pH is outside this range or when the auxiliary acidic agent is omitted. The epoxidation of the organic ester starts almost immediately on contact of the ester and the aqueous mixture. Then the reaction progresses rapidly and smoothly. And it does not become dangerously exothermic at any time. Not only are the smoothness, safety and efficiency of the reaction increased by the use of the auxiliary acidic agent which imparts a pH of 0.0 to $-1.5$ to the mixture of peroxide and formic acid, but the product contains a high ratio of oxirane-oxygen, a low amount of residual unsaturation, and a minimum amount of hydroxy and/or acyloxy substituents. Thus, by the use of the auxiliary acidic agent, the efficiency of the entire operation of producing epoxidized esters is increased.

The process of this invention applies to the esters of water-insoluble, aliphatic, unsaturated acids and it is particularly suitable for the epoxidation of the esters of those fatty acids which occur in natural vegetable oils. The most important of the fatty acids are oleic, linoleic and linolenic acids. The esters which are epoxidized by the process of this invention are those of the monohydric and polyhydric alcohols typified by the following: mono-, di-, and tri-substituted carbinols, such as ethyl, isopropyl, n-butyl, sec.-butyl, tert.-butyl, tert.-amyl, n-octyl, 2-ethylhexyl, octadecyl, lauryl, cyclohexyl and benzyl alcohols; polyhydric alcohols such as ethylene glycol, 1,2-propylene glycol, 2-ethylhexandiol-1,3, butanol-1,2; butandiol-1,3, butandiol-1,4, dodecandiol-1,12; polyalkylene glycols such as di- and tri-ethylene glycols; glycerol; pentaerythritol; and the isomers and homologues of the above. Esters of a mixture of alcohols are likewise readily epoxidized by this process, such as mixtures of ethyl oleate and butyl oleate, or of benzyl linoleate and cyclohexyl linoleate, or of octyl oleate and dodecyl linoleate, or of octyl linolenate and dodecyl linolenate, et cetera. Not only are mixtures of esters operable in the process of this invention but mixed esters of the acids may also be used and converted to epoxidized materials. Semi-drying and drying vegetable oils are examples of naturally occurring mixed glyceryl esters of oleic, linoleic and linolenic acids which can be most advantageously epoxidized. The semi-drying oils are essentially mixed glyceryl esters of oleic, linoleic and saturated monocarboxylic acids, notably stearic acid, and when these are epoxidized according to the instant process the double bonds in the glycerol-esterified oleic and linoleic acids are converted to epoxide groups; and the presence of the esterified saturated acids has no apparent effect on the course of the epoxidation reaction. Drying oils contain, in addition to esterified oleic and linoleic acid, triply unsaturated esterified linolenic acid. Such oils are also included within the scope of this invention. Vegetable oils which have been successfully epoxidized by the instant process include the following: soybean, corn, cottonseed, safflower, sunflower, sesame, poppyseed, walnut, peanut, linseed and perilla oils.

The average amount of unsaturation in vegetable oils which determines the amount of peroxide and formic acid to be used is ordinarily known or can be readily determined by standard methods, such as a determination of the bromine-number or the iodine-number. The esters of substituted alcohols wherein the alcohol portion contains inert substituents which are not reactive with the aqueous peroxidic mixture, such as a halogen or an ether group, may be epoxidized by this process. Esters of aromatic alcohols, such as benzyl alcohol, which are free of aliphatic or non-benzenoid unsaturation are also included within the scope of this invention. The preferred class of esters, however, which are operable herein are those in which the alcohol moiety is that of an unsubstituted and aliphatically saturated alcohol; viz, the alkanols, alkandiols, alkantriols, and alkantetrols.

The process of this invention has been applied equally well to the epoxidation of esters of unsaturated acids other than oleic, linoleic and linolenic acids. It is a particularly effective process for the epoxidation of esters of water-insoluble, unsaturated, aliphatic acids including the following: undecylenic, myristolenic, palmitolenic, petroselic and erucic acids.

In the preferred embodiment of this invention, an aqueous dispersion is made of hydrogen peroxide, formic acid, and the auxiliary acidic agent—preferably phosphoric acid—in such an amount that the pH value of the aqueous phase is 0.0 to $-1.5$. The unsaturated ester to be epoxidized is stirred and heated to a temperature between about 50° C. and 80° C. About one-tenth of the acidic mixture is added to the stirred, unsaturated ester. Reactivity is usually manifested by a slight rise in the temperature of the reaction mixture; and external heating may be reduced or discontinued since the exothermic nature of the reaction is ordinarily sufficient to maintain the temperature. In the case of the more reactive esters, it is sometimes necessary to employ conventional cooling means. Thereafter, portions of the peroxidic mixture are added periodically and as soon as possible while the temperature is maintained at the desired level. The addition of nine aliquot portions at intervals of about thirty minutes is recommended. After the last portion has been added, the reaction mixture is stirred at the elevated temperature until epoxidation is essentially complete. A period of about three hours is usually adequate at temperatures within the range of 50° C. to 80° C. The cooled reaction mixture is next separated into an aqueous phase and an organic phase, the latter being the epoxidized ester. The rate of separation can be greatly increased by the addition of a water-immiscible liquid which is a solvent for the epoxidized ester. An organic liquid, such as toluene, is good for this purpose. The separated organic phase is washed thoroughly with a neutralizing solution such as a solution of sodium bicarbonate and water, and is then stripped by distillation of any organic liquid which may have been used.

Substantially the same rapid rate of reaction is realized when the peroxidic mixture is added slowly and continuously over approximately the same length of time as is required to add aliquot portions. Furthermore, essentially the same results are obtained when the hydrogen peroxide, formic acid and acidic agent are added individually and simultaneously or when the acidic agent is mixed with either the peroxide or the formic acid. What is essential to the success of this process is that the aqueous mixture contain formic acid, hydrogen peroxide and an auxiliary acidic agent when it is reacted with the unsaturated ester and that it have a pH value of 0.0 to $-1.5$. During the epoxidation reaction, the pH of the aqueous peroxidic mixture in contact with the organic ester rises slowly but it is most desirable that the pH not be allowed to exceed a value of $+1.5$ since the rate of epoxidation slows down unnecessarily and objectionably.

The following examples, in which all parts are by weight unless otherwise indicated, serve to illustrate the process of this invention as applied to typical unsaturated esters.

EXAMPLE 1

Into a reaction vessel equipped with reflux condenser, thermometer and mechanical stirrer was charged 200 parts of soybean oil (equivalent to 1.1 moles of unsaturation). To the stirred oil was added, over a period of 1.5 hours, a mixture which contained 74.8 parts of 50% hydrogen peroxide (1.1 moles), 16.9 parts of 90% formic acid (0.33 mole), and 3.5 parts of 85% phosphoric acid (0.03 mole). The aqueous mixture had a pH value of −0.65 and was itself maintained at 5° C. or lower. The temperature was rigidly maintained at 25–30° C. both during the addition of the mixture and thereafter. Samples of the reaction mixture were withdrawn at various intervals and the progress of the reaction was followed by a determination of the percentage of oxirane-oxygen in the product and also by the iodine number thereof. Each sample was allowed to separate into an aqueous phase which was discarded and into an organic phase which was washed first with a saturated solution of sodium bicarbonate and then with water, after which it was dried at 100° C., filtered and analyzed.

The results of the analyses of the various samples are here tabulated:

| Total time of reaction (hrs.) | Percent oxirane-oxygen | Iodine number |
|---|---|---|
| 2¼ | 2.2 | 85.3 |
| 4½ | 3.6 | 57.5 |
| 7½ | 4.6 | 37.6 |
| 12 | 5.5 | 21.4 |
| 23 | 5.9 | 8.9 |

EXAMPLE 2

The same equipment, reactants and procedural steps were followed here as in Example 1 with one exception, namely that the phosphoric acid was omitted. The pH of the mixture of peroxide and formic acid was −0.1.

The results of the analyses of the various samples are here tabulated:

| Total time of reaction (hrs.) | Percent oxirane-oxygen | Iodine number |
|---|---|---|
| 2¼ | 1.4 | 98.3 |
| 4½ | 2.6 | 77.5 |
| 7½ | 3.3 | 61.8 |
| 12 | 4.2 | 44.9 |
| 23 | 5.3 | 21.1 |

From a comparison of this tabulation with that in Example 1, it is apparent that the rate of epoxidation is decidedly more rapid by the process of the first example.

EXAMPLE 3

The same procedure was followed in this example as is described in Example 1 above. In one instance, the cold aqueous mixture contained only formic acid, in an amount equivalent to 0.62 mole per mole of unsaturation, and hydrogen peroxide, in an amount equivalent to 1.03 moles per mole of unsaturation. In the other instance the cold aqueous mixture contained, in addition to the formic acid and peroxide, phosphoric acid in an amount equivalent to 0.023 mole per mole of unsaturation. In each case the aqueous peroxidic mixture was added over a period of 1.5 hours to the oil which was maintained rigidly at 25–30° C. Samples were removed at intervals and were worked up and analyzed by the process described in Example 1. Following is a tabulation of the analytical results which are a measure of the course of each reaction:

| Time of reaction (hrs.) | Percent oxirane-oxygen Without $H_3PO_4$ | Percent oxirane-oxygen With $H_3PO_4$ | Iodine number Without $H_3PO_4$ | Iodine number With $H_3PO_4$ |
|---|---|---|---|---|
| 2¼ | 1.8 | 2.5 | 96 | 80 |
| 4½ | 3.6 | 4.4 | 59 | 42 |
| 7½ | 4.7 | 5.3 | 37 | 22 |

EXAMPLE 4

A method which employs an unusually low amount of formic acid but which nevertheless gives rise to highly epoxidized esters is typified by the following procedure: Into a reaction vessel equipped with mechanical stirrer, thermometer and reflux condenser was charged 1,235 parts of soybean oil and the oil was stirred and heated to 70° C. To the hot oil was then added 55 parts of a cold aqueous mixture which had a pH of −0.65 and contained 37 parts of 85% phosphoric acid, 52.5 parts of 90% formic acid and 460 parts of 50% hydrogen peroxide. The amount of formic acid was equivalent to 0.156 mole per mole of unsaturation in the oil while the amount of phosphoric acid was equivalent to 0.0475 mole and the amount of hydrogen peroxide was equivalent to 1.03 moles on the same basis. The mixture was stirred at 70–75° C. for one-half hour after which nine aliquots of the peroxidic mixture were added at 30-minute intervals while the temperature was maintained within the range of 70–75° C. At the end of this time, a sample was removed and worked up as described in Example 1. The oil was found to have an oxirane-oxygen content of 5.3 and an iodine number of 21.1. The reaction was continued for three hours at 70–75° C. To the cooled mixture was then added 600 parts of toluene and the organic layer which separated was removed from the aqueous layer, was washed first with about one-half its volume of a saturated aqueous solution of sodium bicarbonate and then was washed three times with one-half its volume of water. The toluene and any water present were removed by distillation up to 100° C. at a pressure of 10 mm. The final product had an oxirane-oxygen content of 5.8 and an iodine number of 7.5.

EXAMPLE 5

The advantageous effect of using an auxiliary acidic agent when the amount of formic acid in the peroxidic mixture is extremely low is shown by the following: The process of Example 4 above was followed here. The amounts of the components of the aqueous mixture were, however, such that formic acid was present in a ratio of only 0.052 mole per mole of unsaturation in the oil, phosphoric acid was present in the ratio of 0.05 mole and hydrogen peroxide was present in the ratio of 1.03 moles on the same basis. Samples of the reaction products removed at intervals had the following analyses:

| Time of reaction (hrs.) | Percent oxirane-oxygen | Iodine number |
|---|---|---|
| 4½ | 4.3 | 44 |
| 6 | 5.1 | 30 |
| 7½ | 5.4 | 24 |

EXAMPLE 6

The effect of various acidic agents on the rate of epoxidation was determined by the process of Example 4 above. The total amount of formic acid used was equivalent to 0.156 mole per mole of unsaturation in the oil while the amount of hydrogen peroxide was equivalent to 1.03 moles on the same basis. The ratios of the individual acidic agents, based on each mole of unsaturation, are tabulated below together with the pH values of the resultant mixtures. Samples of the reaction mixtures were removed between the additions of the fifth and sixth aliquots of the aqueous peroxidic mixtures (about 2.25 hours) and after the addition of the tenth aliquot (about 4.5 hours). The samples were worked up in the manner described above. They were then analyzed for oxirane-oxygen content and iodine number as a means of determining the rate of epoxidation. Following is a tabulation of the results:

| Acidic agent | Ratio per mole of unsaturation | pH | Time in hours | Percent oxirane-oxygen | Iodine number |
|---|---|---|---|---|---|
| None | | | 2.25 | 1.7 | 94 |
| | | | 4.5 | 4.1 | 46 |
| $H_3PO_4$ | 0.048 | −0.65 | 2.25 | 2.9 | 69 |
| | | | 4.5 | 5.3 | 21 |
| $HNO_3$ | 0.016 | −0.88 | 2.25 | 2.2 | 89 |
| | | | 4.5 | 4.8 | 40 |
| $HBF_4$ | 0.006 | −0.65 | 2.25 | 2.4 | 87 |
| | | | 4.5 | 4.4 | 36 |
| Butyl diacid phosphate | 0.061 | −0.65 | 2.25 | 2.7 | 81 |
| | | | 4.5 | 5.3 | 36 |
| Methane sulfonic acid | 0.006 | −0.65 | 2.25 | 2.5 | 75 |
| | | | 4.5 | 4.8 | 29 |
| $H_3BO_3$ | 0.689 | −0.1 | 2.25 | 2.1 | 81 |
| | | | 4.5 | 4.9 | 33 |
| $K_2S_2O_8$ | 0.023 | −0.1 | 2.25 | 2.7 | 78 |
| | | | 4.5 | 5.1 | 26 |
| Oxalic acid | 0.036 | −0.65 | 2.25 | 2.0 | 86 |
| | | | 4.5 | 4.2 | 41 |

Although the above examples are confined to the epoxidation of soybean oil, it is to be understood that the process of this invention is used to equal advantage in the epoxidation of the esters of unsaturated acids in general, as described above. Following are additional examples of the epoxidation of such esters.

EXAMPLE 7

Into a reactor equipped with thermometer, mechanical stirrer and reflux condenser was charged 338 parts (1 mole) of butyl oleate. This was stirred and heated to 85° C., at which point the addition of an aqueous peroxidic mixture was begun. The mixture contained 88.5 parts of a 50% solution of hydrogen peroxide (1.3 moles), 12.8 parts of a 90% solution of formic acid (0.25 mole), and 2.3 parts of 85% phosphoric acid (0.02 mole). The mixture was added slowly and continuously over a period of three hours while the temperature was maintained at 80–85° C. Thereafter the reaction mixture was stirred for an additional period of three hours at 85° C. The cooled reaction mixture was worked up in the manner described above. The epoxidized product had an oxirane-oxygen content of 3.9% and an iodine number of 5.

EXAMPLE 8

The general procedure of Example 7 was followed in the epoxidation of 2-ethylhexyl linoleate. A stirred solution of 196 parts of 2-ethylhexyl linoleate (0.5 mole of ester equivalent to 1.0 mole of unsaturation) in 123 parts of toluene was heated to 65° C. and held there while to it was added over a period of 4.5 hours an aqueous mixture of 7.2 parts (0.14 mole) of 90% formic acid, 95.5 parts (1.4 moles) of 50% hydrogen peroxide and 5.3 parts (0.046 mole) of 85% $H_3PO_4$. The reaction mixture was thereafter stirred at 65° C. for 4 more hours. The product contained 5% oxirane-oxygen and had an iodine number of 12.

EXAMPLE 9

Cottonseed oil (219 parts equivalent to 1 mole of unsaturation) was heated to 75° C. and was held and stirred at that temperature while to it was added, over a period of three hours, an aqueous mixture containing 68 parts of 50% hydrogen peroxide (1.0 mole), 7.7 parts of 90% formic acid (0.15 mole) and 5.5 parts of 85% $H_3PO_4$ (0.048 mole). Thereafter the reaction was continued at 75° C. for three hours. The final epoxidized oil had an oxirane-oxygen content of 5.3% and an iodine number of 4.

EXAMPLE 10

Safflower oil (175 parts equivalent to one mole of unsaturation) was heated to 75° C. and held there while to it was added over a period of three hours a mixture containing 75 parts (1.1 mole) of 50% hydrogen peroxide, 8.2 parts (0.16 mole) of 90% formic acid and 5.9 parts (0.05 mole) of phosphoric acid. The reaction mixture was then held at 75° C. for 4 hours. The epoxidized safflowerseed oil product had an oxirane-oxygen of 6.3% and an iodine number of 9.

EXAMPLE 11

Linseed oil in an amount equivalent to 1 mole of unsaturation (135 parts) was epoxidized under the same conditions and with a peroxide mixture containing the same ratio of reactants as set forth in Example 8 above. The epoxidized linseed oil had an oxirane-oxygen content of 7.5% and an iodine number of 10.

The pH values mentioned herein are those determined at 25° C. A very convenient method for determining negative pH values without the use of indicators, and which was adopted in the development of the instant invention, is carried out as follows: With a standard buffer having a real pH of 2.0 a Beckman pH Meter (e.g. Model H–2 with 4990–83 glass electrode and 4970 reference electrode) is adjusted to read a pH of 5.0. The pH meter, thus adjusted to a "negative three scale," is used in the customary way and the values read therefrom are corrected by the addition of the value −3.0.

We claim:
1. In a process for epoxidizing an ester of a water-insoluble unsaturated, unsubstituted aliphatic acid by reacting the ester with an aqueous mixture, at a temperature from about 10° C. to the boiling point of the mixture, containing hydrogen peroxide, formic acid and a small amount of an inorganic acid and in which the hydrogen peroxide is present in an amount equivalent to at least one mole for each double bond in each mole of said ester and the formic acid is present in an amount equivalent to 0.02 to 1.0 mole for each double bond in each mole of said ester, the improvement wherein the inorganic acid is phosphoric acid and the initial pH of the aqueous mixture is 0.0 to −1.5.

2. A process according to claim 1 in which the reaction is effected at a temperature in the range of about 10° C. to about 100° C. and the reaction mixture is kept at a pH which does not exceed +1.5 substantially entirely through the reaction period.

3. A process according to claim 1 in which the reaction is effected at a temperature in the range of about 50° C. to about 80° C. and the formic acid is present in an amount equivalent to 0.05 to 0.5 mole for each double bond in each mole of said ester.

4. In a process for epoxidizing an ester or mixture of esters of at least one acid from the group consisting of oleic, linoleic and linolenic acids by reacting the ester or esters at a temperature from about 10° to about 100° C. with an aqueous mixture which contains hydrogen peroxide, formic acid and an inorganic acid, the hydrogen peroxide being present in an amount equivalent to at least one mole for each double bond in each mole of said ester or esters and the formic acid being present in an amount equivalent to 0.02 to 1.0 mole for each double bond in each mole of the ester or esters, the improvement wherein the inorganic acid is phosphoric acid and the initial pH of the aqueous mixture is 0.0 to −1.5.

5. A process according to claim 4 in which the reaction is effected at a temperature in the range of about 10° C. to about 100° C. and the reaction mixture is kept at a pH which does not exceed +1.5 substantially entirely through the reaction period.

6. A process according to claim 1 in which the ester is a vegetable oil and the reaction is egected at a temperature in the range of about 50° C. to about 80° C.

7. A process according to claim 1 in which the ester is a semi-drying vegetable oil and the reaction is effected at a temperature in the range of about 50° C. to about 80° C.

8. A process according to claim 6 in which the reaction mixture is kept at a pH which does not exceed +1.5 substantially entirely through the reaction period.

References Cited

UNITED STATES PATENTS 2,485,160   10/1949   Niederhauser et al.
3,112,325   11/1963   Murata et al.

OTHER REFERENCES

Swern: Chemical Reviews, 45, pp. 1–5 (August 1949), Organic Peracids.

HENRY R. JILES, *Primary Examiner.*

S. WINTERS, *Assistant Examiner.*

U.S. Cl. X.R.

260—348, 502